United States Patent
Kawaguchi et al.

(10) Patent No.: US 10,017,653 B2
(45) Date of Patent: Jul. 10, 2018

(54) INK COMPOSITION, INK JET RECORDING METHOD, AND COLORED SUBSTANCE

(71) Applicant: Nippon Kayaku Kabushiki Kaisha, Tokyo (JP)

(72) Inventors: Akira Kawaguchi, Tokyo (JP); Maiko Iuchi, Tokyo (JP); Ha Sai, Tokyo (JP); Toru Ishii, Tokyo (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/127,643

(22) PCT Filed: Mar. 26, 2015

(86) PCT No.: PCT/JP2015/059440
§ 371 (c)(1),
(2) Date: Sep. 20, 2016

(87) PCT Pub. No.: WO2015/147192
PCT Pub. Date: Oct. 1, 2015

(65) Prior Publication Data
US 2017/0137647 A1    May 18, 2017

(30) Foreign Application Priority Data

Mar. 26, 2014 (JP) .................. 2014-064361

(51) Int. Cl.
*C09D 11/107* (2014.01)
*B41J 2/21* (2006.01)
*C09D 11/322* (2014.01)

(52) U.S. Cl.
CPC ............ *C09D 11/322* (2013.01); *B41J 2/21* (2013.01); *C09D 11/107* (2013.01)

(58) Field of Classification Search
CPC ..... C09D 11/30; C09D 11/322; C09D 11/107; B41J 2/21
USPC ..................................... 428/195.1
See application file for complete search history.

(56) References Cited

U.S. PATENT DOCUMENTS

| | | |
|---|---|---|
| 6,417,239 B1 | 7/2002 | Murray et al. |
| 2006/0063871 A1 | 3/2006 | Taylor et al. |
| 2007/0117882 A1* | 5/2007 | Aoyama ............. C09D 11/322 523/160 |
| 2009/0203833 A1 | 8/2009 | Sasada et al. |
| 2011/0057985 A1 | 3/2011 | Kakino et al. |
| 2012/0229575 A1 | 9/2012 | Ikegami et al. |

FOREIGN PATENT DOCUMENTS

| | | |
|---|---|---|
| EP | 0348565 A1 | 1/1990 |
| EP | 1108759 A2 | 6/2001 |
| EP | 2628776 A1 | 8/2013 |
| JP | 2000-034432 | 2/2000 |
| JP | 2000-336292 | 12/2000 |
| JP | 2009-191133 | 8/2009 |
| JP | 2010-280830 | 12/2010 |
| JP | 2011-057830 | 3/2011 |
| JP | 2011-132497 | 7/2011 |
| JP | 2013-124356 | 6/2013 |
| WO | WO 99/10413 A2 | 3/1999 |

OTHER PUBLICATIONS

Machine Translation of JP 2010-280830 obtained Jun. 2, 2017.*
http://www.scienceclarified.com/Di-El/Dyes-and-Pigments.html (obtained Jun. 20, 2017).*
Supplementary European search report in European Patent Application No. 15768670.0, dated Feb. 13, 2017.

* cited by examiner

*Primary Examiner* — Coris Fung
*Assistant Examiner* — Sathavaram I Reddy
(74) *Attorney, Agent, or Firm* — Knobbe Martens Olson & Bear LLP

(57) ABSTRACT

An aqueous pigment ink composition having high scratch resistance and good ejection properties and redispersibility, an ink jet recording method using the aqueous pigment ink composition, and a colored substance including the aqueous pigment ink composition. The ink composition includes a colorant, a resin, and water. The colorant includes a coloring matter that is substantially insoluble in water. The resin is a polymer produced by polymerization of at least one monomer represented by the following formula (1) in which $R_1$ denotes a hydrogen atom or a methyl group, and $R_2$ denotes a methyl group, a C8 alkyl group, or the like.

(1)

11 Claims, No Drawings

INK COMPOSITION, INK JET RECORDING METHOD, AND COLORED SUBSTANCE

CROSS-REFERENCE TO RELATED APPLICATIONS

This application is the U.S. National Phase under 35 U.S.C. § 371 of International Application PCT/JP2015/059440, filed Mar. 26, 2015, which was published in Japanese as WO 2015/147192 on Oct. 1, 2015, which claims priority to Japanese Patent Application No. 2014-064361, filed Mar. 26, 2014, the entire contents of which are incorporated herein by reference.

TECHNICAL FIELD

The present invention relates to an ink composition, an ink jet recording method using the ink composition, and a colored substance including the ink composition.

BACKGROUND ART

A recording method that uses an ink jet printer, which is a typical one of various color recording methods, includes producing ink droplets and depositing the ink droplets on a recording material (such as paper, film, or textile). This method is silent without sounds caused by direct contact between a recording head and a recording material and can be easily performed in a smaller scale and at a higher speed. Because of these advantages, the method is being rapidly adopted, and usage thereof is expected to increase in the future.

In an ink jet recording method that uses an aqueous ink, in addition to recording materials having an ink-receiving layer, such as ink jet paper and ink jet glossy paper, recording materials having no ink-receiving layer and having low ink absorption ability, such as general-purpose plain paper, can also be used as recording materials.

Among these, recording materials having no ink-receiving layer are impermeable to ink, and most of a colorant remains on the surface of the recording materials. Thus, touching the materials with a finger or rubbing the materials together sometimes results in scratch-related problems, such as easy separation of pigment. This tendency is particularly marked with aqueous pigment inks.

Although water-insoluble coloring matter, such as pigments, are known to resist light, ozone, or water, when an ink comprising a water-insoluble coloring matter is dried, and the coloring matter aggregates, it is difficult to redisperse the coloring matter due to its water insolubility. Because of such characteristics, water-insoluble coloring matter are likely to cause troubles, such as clogging of a printer head. Thus, there is a strong demand for inks having high redispersibility in water even after the inks are dried.

It is proposed to add a particular polymeric material to an ink jet recording ink composition to improve the scratch resistance of the ink composition. In particular, an ink jet ink composition to which resin emulsion is added is proposed. However, it is difficult to achieve sufficiently high scratch resistance and ejection stability.

CITATION LIST

Patent Literature

PTL 1: Japanese Unexamined Patent Application Publication No. 2000-34432

PTL 2: Japanese Unexamined Patent Application Publication No. 2000-336292

PTL 3: Japanese Unexamined Patent Application Publication No. 2009-191133

SUMMARY OF INVENTION

Technical Problem

It is an object of the present invention to provide an aqueous pigment ink composition having high scratch resistance and good ejection properties and redispersibility, an ink jet recording method using the aqueous pigment ink composition, and a colored substance including the aqueous pigment ink composition.

As a result of extensive studies to solve the problems described above, the present inventors completed the present invention by finding that the problems can be solved with an ink composition comprising a colorant and a resin emulsion in an aqueous medium, wherein the resin emulsion is a polymer produced from an acrylic-modified monomer represented by the following formula (1).

The present invention relates to the following 1) to 12).

1) An ink composition comprising a colorant, a resin, and water, wherein the colorant comprises a coloring matter that is substantially insoluble in water, and the resin is a polymer produced by polymerization of at least one monomer represented by the following formula (1):

[Chem. 1]

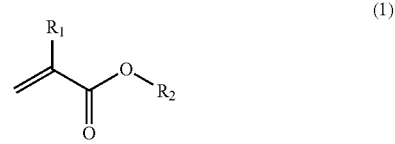

(1)

wherein $R_1$ denotes a hydrogen atom or a methyl group, and $R_2$ denotes a hydrogen atom, a methyl group, or a C8 alkyl group.

2) The ink composition according to 1), wherein the at least one monomer represented by the formula (1) comprises a monomer having a 2-ethylhexyl group as $R_2$.

3) The ink composition according to 1) or 2), wherein the at least one monomer represented by the formula (1) comprises a monomer A having a hydrogen atom as $R_1$ and a 2-ethylhexyl group as $R_2$, and a monomer B having a methyl group as $R_1$ and $R_2$, and the polymer has a glass transition point in the range of −10° C. to 20° C.

4) The ink composition according to any one of 1) to 3), wherein the at least one monomer represented by the formula (1) comprises 40 to 60 parts by mass of a monomer A having a hydrogen atom as $R_1$ and a 2-ethylhexyl group as $R_2$, and 60 to 40 parts by mass of a monomer B having a methyl group as $R_1$ and $R_2$.

5)

The ink composition according to any one of 1) to 4), wherein the resin is a polymer produced by polymerization of the at least one monomer represented by the formula (1) and allyl methacrylate.

6) The ink composition according to any one of 1) to 5), further comprising a dispersant having a weight-average molecular weight in the range of 10000 to 60000.

7) The ink composition according to any one of 1) to 6), wherein the total colorant content ranges from 3% to 15% by mass of the total mass of the ink composition.

8) The ink composition according to any one of 1) to 7), further comprising a water-soluble organic solvent.

9) The ink composition according to any one of 1) to 8) for use in ink jet recording.

10) Use of the ink composition according to any one of 1) to 8) for ink jet recording.

11) An ink jet recording method for ejecting droplets of the ink composition according to any one of 1) to 8) in response to a recording signal and thereby depositing the droplets on a recording material.

12) The ink jet recording method according to 11), wherein the recording material is an information transmission sheet.

13) The ink jet recording method according to 12), wherein the information transmission sheet is a sheet of plain paper or a sheet having an ink-receiving layer comprising a porous white inorganic substance.

14) A colored substance colored by the ink jet recording method according to any one of 11) to 13).

15) An ink jet printer including a container comprising the ink composition according to any one of 1) to 8).

Advantageous Effects of Invention

The present invention can provide an aqueous pigment ink composition having high scratch resistance and good ejection properties and redispersibility, an ink jet recording method using the aqueous pigment ink composition, and a colored substance including the aqueous pigment ink composition.

DESCRIPTION OF EMBODIMENTS

Unless otherwise specified, "%" and "part(s)" in the present specification are based on mass. The term "C.I.", as used herein, refers to "color index".

The colorant comprises at least a coloring matter that is substantially insoluble in water. The phrase "a coloring matter that is substantially insoluble in water" means that the amount of coloring matter dissolved in 100 parts of water at 25° C. is generally 2 g or less, preferably 1 g or less, more preferably 0.1 g or less. Examples of such a coloring matter include known pigments and disperse dyes. These colorants can be used in combination as required.

The ink composition preferably comprises not more than two colorants, more preferably one colorant.

Examples of the pigment include inorganic pigments, organic pigments, and extender pigments.

Examples of the inorganic pigments include carbon black, metal oxides, hydroxides, sulfides, ferrocyanides, and metal chlorides.

Examples of the carbon black include thermal black, acetylene black, oil-furnace black, gas-furnace black, lampblack, gas black, and channel black.

Among these, furnace black, lampblack, acetylene black, and channel black are preferred as carbon black.

Specific examples of the carbon black include Raven 760 ULTRA, Raven 780 ULTRA, Raven 790 ULTRA, Raven 1060 ULTRA, Raven 1080 ULTRA, Raven 1170, Raven 1190 ULTRA II, Raven 1200, Raven 1250, Raven 1255, Raven 1500, Raven 2000, Raven 2500 ULTRA, Raven 3500, Raven 5000 ULTRA II, Raven 5250, Raven 5750, and Raven 7000 (manufactured by Columbian Carbon Co.); Monarch 700, Monarch 800, Monarch 880, Monarch 900, Monarch 1000, Monarch 1100, Monarch 1300, Monarch 1400, Regal 1330R, Regal 1400R, Regal 1660R, and Mogul L (manufactured by Cabot Corporation); Color Black FW1, Color Black FW2, Color Black FW2V, Color Black FW200, Color Black S150, Color Black S160, Color Black S170, Printex 35, Printex U, Printex V, Printex 140U, Printex 140V, SpecIal Black 4, SpecIal Black 4A, SpecIal Black 5, and Special Black 6 (manufactured by Degussa AG); and MA7, MA8, MA100, MA600, MCF-88, No. 25, No. 33, No. 40, No. 47, No. 52, No. 900, and No. 2300 (manufactured by Mitsubishi Chemical Corporation).

Examples of the organic pigments include soluble azo pigments, insoluble azo pigments, insoluble diazo pigments, condensed azo pigments, phthalocyanine pigments, quinacridone pigments, isoindolinone pigments, dioxazine pigments, perylene pigments, perinone pigments, thioindigo pigments, anthraquinone pigments, and quinophthalone pigments.

Specific examples of the organic pigments include yellow pigments, such as C.I. Pigment Yellow 1, 2, 3, 12, 13, 14, 16, 17, 24, 55, 73, 74, 75, 83, 93, 94, 95, 97, 98, 108, 114, 128, 129, 138, 139, 150, 151, 154, 180, 185, 193, 199, and 202; red pigments, such as C.I. Pigment Red 5, 7, 12, 48, 48:1, 57, 88, 112, 122, 123, 146, 149, 166, 168, 177, 178, 179, 184, 185, 202, 206, 207, 254, 255, 257, 260, 264, and 272; blue pigments, such as C.I. Pigment Blue 1, 2, 3, 15, 15:1, 15:2, 15:3, 15:4, 15:6, 16, 22, 25, 60, 66, and 80; violet pigments, such as C.I. Pigment Violet 19, 23, 29, 37, 38, and 50; orange to brown pigments, such as C.I. Pigment Orange 13, 16, 68, 69, 71, and 73; green pigments, such as C.I. Pigment Green 7, 36, and 54; and black pigments, such as C.I. Pigment Black 1.

Examples of the extender pigments include silica, calcium carbonate, talc, clay, barium sulfate, and white carbon. These extender pigments are often used in combination with inorganic pigments or organic pigments rather than used alone.

Examples of the disperse dyes include azobenzene disperse dyes and anthraquinone disperse dyes.

Specific examples of the disperse dyes include yellow disperse dyes, such as C.I. Dispers Yellow 9, 23, 33, 42, 49, 54, 58, 60, 64, 66, 71, 76, 79, 83, 86, 90, 93, 99, 114, 116, 119, 122, 126, 149, 160, 163, 165, 180, 183, 186, 198, 200, 211, 224, 226, 227, 231, and 237; red disperse dyes, such as C.I. Dispers Red 60, 73, 88, 91, 92, 111, 127, 131, 143, 145, 146, 152, 153, 154, 167, 179, 191, 192, 206, 221, 258, and 283; orange disperse dyes, such as C.I. Dispers Orange 9, 25, 29, 30, 31, 32, 37, 38, 42, 44, 45, 53, 54, 55, 56, 61, 71, 73, 76, 80, 96, and 97; violet disperse dyes, such as C.I. Dispers Violet 25, 27, 28, 54, 57, 60, 73, 77, 79, and 79:1; and blue disperse dyes, such as C.I. Dispers Blue 27, 56, 60, 79:1, 87, 143, 165, 165:1, 165:2, 181, 185, 197, 202, 225, 257, 266, 267, 281, 341, 353, 354, 358, 364, 365, and 368.

The total colorant content generally ranges from 3% to 15% by mass, preferably 3% to 10% by mass, more preferably 3% to 7.5% by mass, of the total mass of the ink composition.

The resin emulsion is an emulsion of a resin produced by polymerization of the at least one monomer represented by the formula (1), that is, an emulsion of a modified acrylic resin. Preferably, at least two monomers represented by the formula (1) are used in combination. In the present specification, a resin produced by polymerization of the at least one monomer represented by the formula (1) is sometimes referred to as a "polymer", and said "polymer" include homopolymers and copolymers.

The resin emulsion can be prepared by any method. For example, a resin is mechanically finely dispersed in an aqueous medium, or a resin emulsion is prepared by emulsion polymerization, dispersion polymerization, or suspension polymerization. The emulsion polymerization may be performed with an emulsifier or may be soap-free emulsion polymerization. A method for preparing the resin emulsion may be a method disclosed in Production Example 1 of Patent Literature 2.

The resin is preferably a polymer having a hydrophilic moiety and a hydrophobic moiety. The resin may have any particle shape. For example, the resin may be spherical or of any shape other than spherical.

The resin generally has an average particle size in the range of 10 nm to 1 μm, preferably 30 nm to 500 nm. An average particle size in this range results in a lower likelihood of clogging of an ink jet head or reaggregation of the resin.

In the formula (1), the C8 alkyl group of $R_2$ may be a linear, branched, or cyclic alkyl group and is preferably a branched alkyl group.

Specific examples of the C8 alkyl group include n-octyl, 2,2-dimethylhexyl, 2-ethylhexyl, 1-methylheptyl, 5-methylheptyl, 1-ethyl-1-methylpentyl, and cyclooctyl groups. Among these, a 2-ethylhexyl group is preferred.

Specific examples of the formula (1) include acrylic acid, methyl acrylate, 2-ethylhexyl acrylate, methacrylic acid, methyl methacrylate, 2-ethylhexyl methacrylate, and 2-ethylhexyl methacrylate. The resin emulsion is preferably produced from at least two monomers selected from these monomers. Among the specific examples, acrylic acid, methacrylic acid, methyl methacrylate, and 2-ethylhexyl acrylate are preferred; monomers comprising at least 2-ethylhexyl acrylate are more preferred; and monomers comprising at least methyl methacrylate and 2-ethylhexyl acrylate are still more preferred.

The resin is preferably produced by polymerization of a monomer represented by the formula (1) and generally approximately 5 parts or less, preferably approximately 0.2 to 3 parts, more preferably approximately 0.5 to 2 parts, of allyl methacrylate per 100 parts of the monomer represented by the formula (1).

When allyl methacrylate is used, the resin is preferably produced from allyl methacrylate (AMA) and three monomers represented by the formula (1): methacrylic acid (MAA), methyl methacrylate (MMA), and 2-ethylhexyl acrylate (2EHA). Although the amounts of these monomers to be used are not particularly limited, Table 1 lists exemplary ranges of the amounts. The amounts of these monomers can be adjusted in the ranges listed in Table 1 as long as the total amount of these monomers is 100 parts. The values in Table 1 are "parts".

When allyl methacrylate (AMA) is substituted with acrylic acid, the amount of acrylic acid can be the same as the amount of allyl methacrylate (AMA) listed in Table 1.

The resin is preferably a polymer produced by polymerization of four monomers represented by the formula (1) composed of methyl methacrylate, 2-ethylhexyl acrylate, methacrylic acid, and acrylic acid and no other monomer, or a polymer produced by polymerization of four monomers, including allyl methacrylate and monomers represented by the formula (1) composed of methacrylic acid, methyl methacrylate, and 2-ethylhexyl acrylate, without other monomers. The latter polymer produced by polymerization of only four monomers composed of methacrylic acid, methyl methacrylate, 2-ethylhexyl acrylate, and allyl methacrylate is particularly preferred.

TABLE 1

| Range of amount used | General example | Preferred example | More preferred example |
|---|---|---|---|
| MAA | 0-4 | 0.5-3.5 | 1-3 |
| MMA | 60-40 | 59-41 | 58-42 |
| 2EHA | 40-60 | 41-59 | 42-58 |
| AMA | 0-5 | 0.2-3 | 0.5-2 |

The resin generally has a glass transition point (Tg) in the range of −10° C. to 20° C., preferably −5° C. to 15° C. The glass transition point (Tg) of resin is measured by differential scanning calorimetry (DSC), for example.

The resin of resin emulsion can generally have a desired acid value by adjusting the ratio of at least one monomer represented by the formula (1). The acid value generally ranges from 0 to 25 KOHmg/g, preferably 5 to 15 KOHmg/g.

The insolubility of the resin in tetrahydrofuran generally ranges from 80% to 100%, preferably 100%, which means insoluble. In this range, the resin can have a controlled average molecular weight and comprise no free monomer.

A polymer (resin) produced by polymerization of the at least one monomer represented by the formula (1) is preferably in the form of resin emulsion. The solid content of the resin emulsion generally has a lower limit of 10%, preferably 15%, more preferably 18%, still more preferably 24%, and an upper limit of 45%, preferably 40%, more preferably 35%. The solid content generally corresponds to the total mass of a polymer (resin) produced by polymerization of the at least one monomer represented by the formula (1).

The total mass of resin emulsion generally has a lower limit of 0.6%, preferably 1.3%, more preferably 1.4%, and an upper limit of 29%, preferably 18%, more preferably 11%, still more preferably 7%, of the total mass of the ink composition.

The total mass of a resin (polymer) produced by polymerization of the at least one monomer represented by the formula (1) generally has a lower limit of 0.1%, preferably 0.2%, more preferably 0.3%, and an upper limit of 10%, preferably 7%, more preferably 5%, still more preferably 3%, of the total mass of the ink composition.

The colorant is preferably blended as a coloring dispersion liquid in which the colorant is dispersed in water with a dispersant. The dispersant generally has a weight-average molecular weight in the range of 8000 to 60000, preferably 10000 to 30000.

The dispersant having a weight-average molecular weight of 8000 or more has high scratch resistance. The dispersant having a weight-average molecular weight of 60000 or less does not increase the viscosity of the ink composition, thus making normal ejection possible.

The colorant can be dispersed in water with a dispersant by a known method using a sand mill (bead mill), a rolling mill, a ball mill, a paint shaker, an ultrasonic homogenizer, or Microfluidizer. Among these, a sand mill (bead mill) is preferred. It is desirable that a coloring dispersion liquid be prepared in a sand mill with small beads (0.01 mm to 1 mm in diameter) such that the dispersion efficiency can be increased at a high beads filling ratio.

After preparation of a coloring dispersion liquid, a particle component having a size significantly different from a target average particle size is preferably removed together with beads, for example, by filtration and/or centrifugation.

When preparation of a coloring dispersion liquid causes foaming, a trace amount of known silicone or acetylene glycol antifoaming agent may be added to prevent foaming. The antifoaming agent thus used preferably does not affect the dispersion or micronization of a colorant and the stability of a dispersed colorant.

Examples of the dispersant include poly(acrylic acid), styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic acid half ester copolymers, vinylnaphthalene-acrylic acid copolymers, and vinylnaphthalene-maleic acid copolymers.

The dispersant may be a commercially available water-soluble resin. Specific examples of such a commercially available water-soluble resin include styrene-acrylic resins, such as Joncryl 62, Joncryl 67, Joncryl 68, and Joncryl 678 manufactured by Johnson Polymer; Mowinyl S-100A (modified poly(vinyl acetate) resin manufactured by Hoechst Synthesis Co., Ltd.); and Jurymer AT-210 (polyacrylate copolymer manufactured by Nihon Junyaku Co., Ltd.). Among these, resins having a carboxy group in their molecules are preferred.

When a dispersant is used, the type and acid value of the dispersant are appropriately selected, and the average particle size of the colorant can generally range from 30 nm to 300 nm, preferably 50 nm to 200 nm, more preferably 60 nm to 120 nm. This results in high dispersion stability of the colorant in the ink composition, high ejection stability in ink jet recording, and high print density of recorded images. The average particle size of a colorant can be measured by a laser light scattering method.

The total dispersant content generally ranges from 0.1% to 4.0% by mass, preferably 0.5% to 3.0% by mass, of the total mass of the ink composition.

The ink composition may comprise an organic solvent. The organic solvent in the ink composition may be a water-soluble organic solvent. The ink composition preferably comprises a water-soluble organic solvent.

Specific examples of the water-soluble organic solvent include linear or branched C1-C3 alcohols, such as methanol, ethanol, 1-propanol, and 2-propanol; ether compounds, such as 1,2-dimethoxyethane, tetrahydrofuran, and p-dioxane; ketones, such as acetone; polyhydric alcohols; and acetic acid. These water-soluble organic solvents may be used alone or in combination.

Examples of the polyhydric alcohol include aliphatic C1-C6 alkanols having two or three hydroxy groups, such as 1,2-hexanediol, 1,6-hexanediol, trimethylolpropane, and hexane-1,2,6-triol; mono, oligo, and poly(alkylene glycol)s having a C2-C6 alkylene unit and thioglycols, such as ethylene glycol, diethylene glycol, 1,2-propylene glycol, 1,3-propylene glycol, 1,2-butylene glycol, 1,4-butylene glycol, 1,6-hexylene glycol, diethylene glycol, triethylene glycol, tetraethylene glycol, dipropylene glycol, poly(ethylene glycol), poly(propylene glycol), thiodiglycol, and dithiodiglycol; and glycerins, such as glycerin and diglycerin.

Among these, glycerins (preferably glycerin) and mono, oligo, and poly(alkylene glycol)s having a C2-C6 alkylene unit (preferably diethylene glycol, triethylene glycol, and 1,2-propylene glycol) are preferred.

The ink composition preferably comprises at least one polyhydric alcohol as a water-soluble organic solvent. The polyhydric alcohol may effectively control the viscosity of the ink composition and prevent drying of the ink composition.

The total water-soluble organic solvent content generally ranges from 10% to 60%, preferably 10% to 40%, of the total mass of the ink composition.

The ink composition generally has a pH in the range of 5 to 11, preferably 7 to 10, in order to improve storage stability.

The ink composition generally has a static surface tension in the range of 10 to 36 mN/m, preferably 20 to 36 mN/m.

The ink composition generally has a viscosity in the range of 3 to 20 mPa·s, preferably 3 to 10 mPa·s.

These values are measured at 25° C. The pH and surface tension of the ink composition can be adjusted with a pH-adjusting agent and a surfactant described below.

The ink composition comprises at least the coloring dispersion liquid and water and optionally comprises a water-soluble organic solvent and an ink preparation agent. When the ink composition is used as an ink jet recording ink, the ink composition preferably comprises a smaller amount of inorganic impurities, such as chlorides (for example, sodium chloride) and sulfates (for example, sodium sulfate) of metal cations. The inorganic impurity content is approximately 1% or less of the total mass of the colorant in the ink composition. The lower limit of the inorganic impurity content may be below the detection limit of the analyzer and may be 0%.

A method for producing an ink composition having a low inorganic impurity content may be a method for adsorbing inorganic impurities by exchange adsorption with an ion-exchange resin for a colorant or an ink composition.

Examples of the ink preparation agent include preservatives and fungicides, pH-adjusting agents, chelating agents, anticorrosives, water-soluble ultraviolet absorbers, water-soluble high-molecular-weight compounds, antioxidants, and/or surfactants.

Specific examples of the fungicides include sodium dehydroacetate, sodium benzoate, sodium pyridinethione-1-oxide, ethyl p-hydroxybenzoate, 1,2-benzisothiazolin-3-one, and salts thereof.

Examples of the preservatives include organic sulfur compounds, organic nitrogen sulfur compounds, organic halogen compounds, haloaryl sulfone compounds, iodopropargyl compounds, haloalkylthio compounds, nitrile compounds, pyridine compounds, 8-oxyquinoline compounds, benzothiazole compounds, isothiazolin compounds, dithiol compounds, pyridine oxide compounds, nitropropane compounds, organotin compounds, phenol compounds, quaternary ammonium salt compounds, triazine compounds, thiazine compounds, anilide compounds, adamantane compounds, dithiocarbamate compounds, brominated indanone compounds, benzyl bromoacetate compounds, and inorganic salt compounds.

Specific examples of the organic halogen compounds include sodium pentachlorophenol.

Specific examples of the pyridine oxide compounds include 2-pyridinethiol-1-oxide sodium.

Examples of the isothiazolin compounds include 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, 5-chloro-2-methyl-4-isothiazolin-3-one calcium chloride, and 2-methyl-4-isothiazolin-3-one calcium chloride.

Specific examples of other preservatives and fungicides include anhydrous sodium acetate, sodium sorbate and sodium benzoate, and trade names Proxel GXL(S) and Proxel XL-2(S) manufactured by Arch Chemicals, Inc.

The pH-adjusting agents may be any substances that do not adversely affect the ink composition to be prepared and that can control the pH of the ink composition in the range described above. Specific examples of the pH-adjusting agents include alkanolamines, such as diethanolamine, triethanolamine, and N-methyldiethanolamine; alkali metal hydroxides, such as lithium hydroxide, sodium hydroxide, and potassium hydroxide; ammonium hydroxide (aqueous ammonia); alkali metal carbonates, such as lithium carbonate, sodium carbonate, sodium hydrogen carbonate, and potassium carbonate; alkali metal salts of organic acids, such as sodium silicate and potassium acetate; and inorganic bases, such as phosphate disodium.

Specific examples of the chelating agents include disodium ethylenediaminetetraacetate, sodium nitrilotriacetate, sodium hydroxyethylethylenediaminetriacetate, sodium diethylenetriaminepentaacetate, and sodium uracildiacetate.

Specific examples of the anticorrosives include acidic sulfite, sodium thiosulfate, ammonium thioglycolate, diisopropylammonium nitrite, pentaerythritol tetranitrate, and dicyclohexylammonium nitrite.

Examples of the water-soluble ultraviolet absorbers include sulfonated benzophenone compounds, benzotriazole compounds, salicylic acid compounds, cinnamic acid compounds, and triazine compounds.

Specific examples of the water-soluble high-molecular-weight compounds include poly(ethylene glycol), poly(vinyl alcohol), cellulose derivatives, polyamines, and polyimines.

Examples of the antioxidants include various organic and metal complex antifading agents. Examples of the organic antifading agents include hydroquinones, alkoxyphenols, dialkoxyphenols, phenols, anilines, amines, indans, chromans, alkoxyanilines, and heterocycles.

Examples of the surfactants include known surfactants, such as anionic surfactants, cationic surfactants, amphoteric surfactants, nonionic surfactants, silicone surfactants, and fluorinated surfactants.

Examples of the anionic surfactants include alkylsulfocarboxylates, α-olefin sulfonates, polyoxyethylene alkyl ether acetates, N-acylamino acids and salts thereof, N-acylmethyltaurine salts, alkyl sulfate polyoxyalkyl ether sulfates, alkyl sulfate polyoxyethylene alkyl ether phosphates, rosin acid soaps, castor oil sulfates, lauryl alcohol sulfates, alkylphenol phosphates, alkyl phosphates, alkylaryl sulfonates, diethyl sulfosuccinates, diethylhexyl sulfosuccinates, and dioctyl sulfosuccinates.

Examples of the cation surfactants include 2-vinylpyridine derivatives and poly(4-vinylpyridine) derivatives.

Examples of the amphoteric surfactants include lauryldimethylaminoacetic acid betaine, 2-alkyl-N-carboxymethyl-N-hydroxyethylimidazolinium betaine, coconut oil fatty acid amide propyldimethylaminoacetic acid betaine, polyoctyl polyaminoethyl glycine, and imidazoline derivatives.

Examples of the nonionic surfactants include ethers, such as polyoxyethylene nonylphenyl ether, polyoxyethylene octylphenyl ether, polyoxyethylene dodecylphenyl ether, polyoxyethylene oleyl ether, polyoxyethylene lauryl ether, and polyoxyethylene alkyl ethers; esters, such as polyoxyethylene oleic acid ester, polyoxyethylene distearate, sorbitan laurate, sorbitan monostearate, sorbitan monooleate, sorbitan sesquioleate, polyoxyethylene monooleate, and polyoxyethylene stearate; acetylene glycols (alcohols), such as 2,4,7,9-tetramethyl-5-decyne-4,7-diol, 3,6-dimethyl-4-octyne-3,6-diol, and 3,5-dimethyl-1-hexyn-3-ol; trade names Surfynol 104PG50, 105PG50, 82, 420, 440, 465, and 485, and Olfin STG, manufactured by Nissin Chemical Industry Co., Ltd.; and polyglycol ethers (for example, Tergitol 15-S-7 manufactured by Sigma-Aldrich Corporation). Among these, Surfynol series (preferably Surfynol 104PG50, Surfynol 440, and Surfynol 465) are preferred.

Examples of the silicone surfactants include polyether-modified siloxane and polyether-modified polydimethylsiloxane. Specific examples of commercially available silicone surfactants include BYK-347 (polyether-modified siloxane), and BYK-345 and BYK-348 (polyether-modified polydimethylsiloxane), manufactured by BYK-Chemie.

Examples of the fluorinated surfactants include perfluoroalkylsulfonic acid compounds, perfluoroalkylcarboxylic acid compounds, perfluoroalkylphosphoric acid ester compounds, perfluoroalkylethylene oxide adducts, and polyoxyalkylene ether polymer compounds having a perfluoroalkyl ether group on a side chain. Specific examples of commercially available fluorinated surfactants include Zonyl TBS, FSP, FSA, FSN-100, FSN, FSO-100, FSO, FS-300, Capstone FS-30, and FS-31 (manufactured by DuPont); and PF-151N and PF-154N (manufactured by Omnova Solutions, Inc.).

These ink preparation agents may be used alone or in combination.

These ink compositions can be prepared by any methods, including known methods. For example, the following preparation method can be used.

If necessary, a colorant in the ink composition is dispersed in an aqueous solution with a dispersant to prepare a coloring dispersion liquid. The coloring dispersion liquid can be mixed with the water-soluble organic solvent and an ink adjusting agent as required to prepare the ink composition.

The ink jet recording method may be an ink jet recording method for ejecting droplets of the ink composition in response to a recording signal and thereby depositing the droplets on a recording material.

The recording method may be of any known system: for example, a charge control system, which utilizes electrostatic attraction force to eject ink; a drop-on-demand system (pressure pulse system), which utilizes the oscillating pressure of a piezoelectric device; an acoustic ink jet system, which converts an electric signal into an acoustic beam, irradiates ink with the acoustic beam, and ejects the ink by utilizing radiation pressure; or a thermal ink jet or Bubble Jet (registered trademark) system, which heats ink to form bubbles and utilizes the resulting pressure.

The ink jet recording method also include a system that ejects many small volumes of photoink, which is an ink having a low colorant content; a system that improves image quality with a combination of inks having substantially the same hue and different colorant contents; and a system that improves the fixability of a colorant with a colorless and transparent ink.

A colored substance is produced by the ink jet recording method. The colored substance is a substance colored with the ink composition, preferably a recording material colored by an ink jet recording method that uses an ink jet printer. The recording material may be, but is not limited to, paper, such as plain paper, an information transmission sheet, such as a film, fiber or cloth (cellulose, nylon, wool, or the like), leather, or a color filter substrate. Among these, information transmission sheets are preferred.

Information transmission sheets are broadly divided into sheets having an ink-receiving layer and sheets having no ink-receiving layer.

For example, information transmission sheets having an ink-receiving layer include paper, synthetic paper, and film substrates having an ink-receiving layer. The ink-receiving layer can be formed by a method of impregnating the substrate with a cationic polymer or a method of applying a cationic polymer to the substrate; or a method of applying inorganic fine particles that can absorb dye from ink, such as porous silica, alumina sol, or special ceramic, together with a hydrophilic polymer, such as poly(vinyl alcohol) or polyvinylpyrrolidone, to the substrate.

Information transmission sheets having an ink-receiving layer are generally referred to as ink jet paper, ink jet film, or glossy paper. Examples of typical commercially available information transmission sheets include trade names Professional Photo Paper, Super Photo Paper, Photo Paper Gold Glossy, and Matte Photo Paper, manufactured by Canon Inc.; trade names photo paper Crispia (high-gloss), photo paper (gloss), and photo matte paper, manufactured by Seiko Epson Corporation; trade name Advanced Photo Paper (gloss) manufactured by Hewlett-Packard Japan, Ltd.; and trade name KASSAI SHASHIN-SHIAGE Pro manufactured by Fujifilm Corporation.

Information transmission sheets having no ink-receiving layer include plain paper. Examples of plain paper include PPC paper; coated paper, art paper, and other paper for use in gravure printing and offset printing; and cast-coated paper for use in label printing.

When information transmission sheets having no ink-receiving layer are used as recording materials, the recording materials are preferably subjected to surface modification treatment to improve the fixability of a colorant.

The surface modification treatment is preferably at least one treatment selected from a known corona discharge treatment, plasma treatment, and frame treatment. These treatments may be performed by any known method. It is generally known that the effects of these treatments diminish with time. Thus, surface modification treatment of an information transmission sheet is preferably immediately and continuously followed by ink jet recording.

In the surface modification treatment, the number of treatments, the treatment time, and the applied voltage can be appropriately adjusted to achieve desired effects.

The information transmission sheet is preferably a sheet of plain paper or a sheet having an ink-receiving layer comprising a porous white inorganic substance.

In the case of recording on a recording material by the ink jet recording method, for example, a container comprising the ink composition is mounted in an ink jet printer at a predetermined position, and then recording is performed on the recording material by the recording method.

In the ink jet recording method, the ink composition may be combined with a color ink composition, such as a known magenta, cyan, yellow, and/or black, and optionally green, blue (or violet), and/or orange ink composition.

Each ink composition is injected into the corresponding container, and the containers are mounted in an ink jet printer at their respective predetermined positions for ink jet recording.

Use of an ink composition according to the present invention can provide recorded images with high print density and color saturation, thus producing visually dense and clear recorded matters with a wide color gamut.

Furthermore, images thus produced can have high robustness, such as scratch resistance, water resistance, light resistance, heat resistance, and/or resistance to oxidizing gases (for example, ozone gas).

The ink composition provides very clear recorded images with high chromaticity (print density) on a recording material, such as a sheet of plain paper or an information transmission sheet having an ink-receiving layer. Thus, photograph-like color images can be produced on paper with high fidelity.

The ink composition has very high storage (preservation) stability without solid precipitation, changes in physical properties, or hue changes after storage for extended periods.

The ink composition can be used for ink jet recording or for writing instruments. In particular, when used as an ink jet ink, the ink composition rarely causes solid precipitation due to drying of the ink composition near the nozzle, does not block the ejector (recording head), and has good ejection properties.

The ink composition causes no change in physical properties and has high redispersibility when the ink is recirculated in a continuous ink jet printer at relatively long time intervals or when the ink is used intermittently in an on-demand ink jet printer.

Images recorded with the ink composition on information transmission sheets having an ink-receiving layer have high robustness, such as scratch resistance, water resistance, moisture resistance, ozone resistance, rubfastness, and light resistance.

EXAMPLES

The present invention will be more specifically described with the following examples. However, the present invention is not limited to these examples.

Emulgen 1150S-60 manufactured by Kao chemicals was used as a polyoxyethylene alkyl ether in preparation examples.

[Preparation Example 1] Preparation of Magenta Dispersion Liquid 11.3 parts of Joncryl 68 (MW: 13000) and 6 parts of triethanolamine were dissolved in 95.2 parts of ion-exchanged water and were stirred for 1 hour. To the obtained solution, 37.5 parts of C.I. Pigment Red 122 (manufactured by Clariant AG, Inkjet Magenta E02) was added, and was dispersed with a sand grinder at 1500 rpm for 20 hours. 150 parts of ion-exchanged water was added dropwise to the obtained dispersion liquid. The dispersion liquid was then filtered to remove dispersing beads, thus yielding a magenta dispersion liquid with a solid content of 15.8%. This dispersion liquid is hereinafter referred to as a "dispersion liquid 1".

[Preparation Example 2] Preparation of Polymer Emulsion 1

A condenser, thermometer, and dropping funnel were attached to a glass reaction vessel (volume: 3 liters)

equipped with a stirrer. The reaction vessel was charged with 60 parts by weight of ion-exchanged water, 0.3 parts by weight of a polyoxyethylene alkyl ether, and 0.3 parts by weight of ammonium persulfate. After air in the reaction vessel was substituted with nitrogen, the internal temperature was adjusted to be 70° C. while stirring. Before that, 70 parts by weight of ion-exchanged water, 10 parts by weight of a polyoxyethylene alkyl ether, 50 parts by weight of methyl methacrylate, 47 parts by weight of 2-ethylhexyl acrylate, 2 parts of methacrylic acid, and 1 part of acrylic acid were mixed in another container to prepare an emulsion. The emulsion was continuously added dropwise to the reaction vessel for 3 hours. During the dropwise addition, a reaction occurred at 70° C. while nitrogen was introduced into the reaction vessel. After the dropwise addition, the product was stirred at 70° C. for another 2 hours and was then cooled to 40° C. After cooling, addition of 150 parts by weight of a polyoxyethylene alkyl ether produced a copolymer.

The resulting polymer emulsion was a white suspension with a solid content of 33.5%.

[Preparation Example 3] Preparation of Polymer Emulsion 2

A copolymer was prepared in the same manner as in Preparation Example 2 except that the emulsifier was a polyoxyethylene dodecyl ether and that no emulsifier was added after cooling to 40° C. The resulting polymer emulsion was a white suspension with an acid value of 13 KOHmg/g, Tg of 1.2° C., and a solid content of 24.9%.

[Preparation Example 4] Preparation of Polymer Emulsion 3

A copolymer was prepared in the same manner as in Preparation Example 2 except that 51 parts of methyl methacrylate and 1 part of methacrylic acid were used and that 1 part of acrylic acid was substituted with 1 part of allyl methacrylate. The resulting polymer emulsion was a white suspension with an acid value of 6 KOHmg/g, Tg of 0° C., and a solid content of 25%.

[Preparation Example 5] Preparation of Polymer Emulsion 4

A copolymer was prepared in the same manner as in Preparation Example 2 except that 52 parts of methyl methacrylate and 44 parts of 2-ethylhexyl acrylate were used and that 1 part of acrylic acid was substituted with 1 part of allyl methacrylate. The resulting polymer emulsion was a white suspension with an acid value of 13 KOHmg/g, Tg of 15° C., and a solid content of 25%.

[Preparation Example 6] Preparation of Polymer Emulsion 5

A copolymer was prepared in the same manner as in Preparation Example 2 except that 1 part of acrylic acid was substituted with 1 part of allyl methacrylate. The resulting polymer emulsion was a white suspension with an acid value of 13 KOHmg/g, Tg of 1.2° C., and a solid content of 33.5%.

Examples 1 to 4 and Comparative Examples 1 to 7

The components listed below in Table 2 were mixed and stirred for approximately 1 hour and were then passed through a 1.20-μm membrane filter (trade name, cellulose acetate filter paper, manufactured by Sartorius Japan K.K.), thus yielding ink compositions for evaluation test according to Examples 1 to 4 and Comparative Examples 1 to 7. None of the ink compositions left a residue on the filter.

Abbreviations in Table 2 are as follows:
PG: propylene glycol.
1,2-HD: 1,2-hexanediol.
DEG: diethylene glycol.
TEA: triethanolamine.
DF100D: Surfynol DF-100D (surfactant) manufactured by Air Products Japan, Inc.
GXL(s): Proxel GXL(S) (fungicide) manufactured by Arch Chemicals, Inc.
PEM1: polymer emulsion 1.
PEM2: polymer emulsion 2.
WLS-201: Hydran WLS-201 (polyurethane-modified resin emulsion, solid content 35%) manufactured by DIC Corporation.
AP-20: Hydran AP-20 (polyurethane-modified resin emulsion, solid content 30%) manufactured by DIC Corporation.
UA-310: Permarin UA-310 (polyurethane-modified resin emulsion, solid content 39%) manufactured by Sanyo Chemical Industries, Ltd.
SF150: Superflex 420 (polyurethane-modified resin emulsion, solid content 30%) manufactured by Dai-ichi Kogyo Seiyaku Co., Ltd.
PDX7687: PDX 7687 (styrene-acrylic-modified resin emulsion, solid content 42%) manufactured by BASF Japan Ltd.
AE104: AE-104 (acrylic-modified resin emulsion, solid content 35%) manufactured by Emulsion Technology Co., Ltd.
"Water" in Table 2 was ion-exchanged water.
In Table 2, for each emulsion, the parts of emulsion used were listed rather than the solid content.

TABLE 2

|  | Example | | | | Comparative example | | | | | | |
| --- | --- | --- | --- | --- | --- | --- | --- | --- | --- | --- | --- |
| Component | 1 | 2 | 3 | 4 | 1 | 2 | 3 | 4 | 5 | 6 | 7 |
| Dispersion liquid 1 | 25.3 | 4.0 | 4.0 | 4.0 | 25.3 | 4.0 | 4.0 | 25.3 | 4.0 | 4.0 | 4.0 |
| PG | 10.0 | 10.0 | 10.0 | 10.0 | 10.0 | 10.0 | 10.0 | 10.0 | 10.0 | 10.0 | 10.0 |
| 1,2-HD | 2.0 | 2.0 | 2.0 | 2.0 | 2.0 | 2.0 | 2.0 | 2.0 | 2.0 | 2.0 | 2.0 |
| DEG | 5.0 | 5.0 | 5.0 | 5.0 | 5.0 | 5.0 | 5.0 | 5.0 | 5.0 | 5.0 | 5.0 |
| TEA | 0.5 | 0.5 | 0.5 | 0.5 | 0.5 | 0.5 | 0.5 | 0.5 | 0.5 | 0.5 | 0.5 |
| DF100D | 0.10 | 0.10 | 0.10 | 0.10 | 0.10 | 0.10 | 0.10 | 0.10 | 0.10 | 0.10 | 0.10 |
| GXL(s) | 0.02 | 0.02 | 0.02 | 0.02 | 0.02 | 0.02 | 0.02 | 0.02 | 0.02 | 0.02 | 0.02 |
| PEM1 | 6.02 | — | 2.01 | — | — | — | — | — | — | — | — |

TABLE 2-continued

| Component | Example 1 | Example 2 | Example 3 | Example 4 | Comparative 1 | Comparative 2 | Comparative 3 | Comparative 4 | Comparative 5 | Comparative 6 | Comparative 7 |
|---|---|---|---|---|---|---|---|---|---|---|---|
| PEM2 | — | 4.48 | — | 1.49 | — | — | — | — | — | — | — |
| WLS-201 | — | — | — | — | 4.29 | — | — | — | — | — | — |
| AP-20 | — | — | — | — | — | 5.02 | — | — | — | — | — |
| UA-310 | — | — | — | — | — | — | 3.89 | — | — | — | — |
| SF-420 | — | — | — | — | — | — | — | 4.95 | — | — | — |
| PDX7687 | — | — | — | — | — | — | — | — | 3.57 | — | — |
| AE104 | — | — | — | — | — | — | — | — | — | 4.28 | — |
| Water | balance | balance | balance | balance | balance | balance | balance | balance | balance | balance | balance |
| Total | 100 | 100 | 100 | 100 | 100 | 100 | 100 | 100 | 100 | 100 | 100 |

[Ejection Property Evaluation Test]

Each of the ink compositions according to the examples and comparative examples was charged into an ink jet printer (manufactured by EPSON, trade name PX-205) and was tested for ejection properties. The ejection properties were rated in four categories A to D using programmed "nozzle check" and "purge" functions. Table 3 shows the results.

A: No missing line in nozzle check after the purge function was performed not more than 3 times.

B: No missing line in nozzle check after the purge function was performed 4 times.

C: Missing lines in less than 5 nozzles in nozzle check after the purge function was performed 4 times.

D: Missing lines in at least 5 nozzles in nozzle check after the purge function was performed 4 times.

[Ink Jet Recording]

Ink jet recording on the following recording material was performed with the ink compositions according to the examples and comparative examples and with an ink jet printer (manufactured by EPSON, trade name PX-205).

Coated paper: Sword i-Jet (Mitsubishi Paper Mills, Ltd.).

The ink jet recording was performed so as to form an image pattern of 100% density. The recorded matters were naturally dried for 24 hours and were used as test specimens for the following evaluation test.

[Scratch Resistance Evaluation Test]

The scratch resistance of each test specimen was evaluated with a No. 428 color fastness rubbing tester manufactured by Yasuda Seiki Seisakusho, Ltd. Ink jet recorded areas were rubbed together 20 times under a load of 300 g, and image degradation was rated in three categories A to C. Table 3 shows the results.

A: Little abrasion of images was observed.

B: The colorant was rubbed off, and approximately 30% of the white ground of the recording material was exposed.

C: The colorant was rubbed off, and approximately 70% of the white ground of the recording material was exposed.

[Redispersibility Evaluation Test]

40 μl of each of the ink compositions according to the examples and comparative examples was dropped into a 50-ml beaker and was dried at room temperature for 18 hours. After 18 hours, 30 g of ion-exchanged water was poured into the beaker, and redispersibility of dried droplets in water was rated in four categories A to D. Table 3 shows the results.

A: Complete redispersion in water while left standing.

B: Complete redispersion in water by gently shaking.

C: Some particles were not redispersed in water even after gentle shaking.

D: No redispersion in water.

TABLE 3

| Test results | Ex. 1 | Ex. 2 | Ex. 3 | Ex. 4 | Comp. 1 | Comp. 2 | Comp. 3 | Comp. 4 | Comp. 5 | Comp. 6 | Comp. 7 |
|---|---|---|---|---|---|---|---|---|---|---|---|
| Ejection properties | A | B | A | A | B | A | C | B | A | B | B |
| Scratch resistance | A | A | A | A | A | A | A | A | C | A | C |
| Redispersibility | B | A | A | A | D | D | D | D | D | D | A |

Table 3 shows that the examples were superior to the comparative examples in all the evaluation items of ejection properties, scratch resistance, and redispersibility.

Examples 5 and 6

An ink composition for evaluation test according to Example 5 was produced in the same manner as in Example 1 except that PEM1 in Table 2 was replaced with the polymer emulsion 3 prepared in Preparation Example 4.

Likewise, an ink composition for evaluation test according to Example 6 was produced in the same manner as in Example 3 except that PEM1 was replaced with the polymer emulsion 4 prepared in Preparation Example 5.

As described above, the ink compositions were subjected to "[Ejection Property Evaluation Test]", "[Ink Jet Recording]", "[Scratch Resistance Evaluation Test]", and "[Redispersibility Evaluation Test]". Table 4 shows the test results.

TABLE 4

| Test results | Example 5 | Example 6 |
|---|---|---|
| Ejection properties | A | A |
| Scratch resistance | A | A |
| Redispersibility | B | A |

Table 4 shows that the examples had good results for all the evaluation items of ejection properties, scratch resistance, and redispersibility.

INDUSTRIAL APPLICABILITY

An ink composition according to the present invention has high scratch resistance as well as good ejection properties and redispersibility and is therefore suitable for various recording inks, for example, for use in writing instruments, particularly for ink jet recording inks.

The invention claimed is:

1. An ink composition comprising a colorant, a resin, and water, wherein the colorant comprises a coloring matter that is substantially insoluble in water, and the resin is a polymer consisting of 0.5 to 3 parts by mass of methacrylic acid, 59 to 41 parts by mass of methyl methacrylate, 41 to 59 parts by mass of 2-ethylhexyl acrylate and 0.2 to 3 parts by mass of allyl methacrylate based on the total amount of monomers being 100 parts by mass.

2. The ink composition according to claim 1, wherein the polymer has a glass transition point in the range of −10° C. to 20° C.

3. The ink composition according to claim 1, further comprising a dispersant having a weight-average molecular weight in the range of 10000 to 60000.

4. The ink composition according to claim 1, wherein the content of the colorant ranges from 3% to 15% by mass of the total mass of the ink composition.

5. The ink composition according claim 1, further comprising a water-soluble organic solvent.

6. The ink composition according to claim 1, wherein said ink composition is used in ink jet recording.

7. An ink jet recording method for ejecting droplets of the ink composition according to claim 1 in response to a recording signal and thereby depositing the droplets on a recording material.

8. The ink jet recording method according to claim 7, wherein the recording material is an information transmission sheet.

9. The ink jet recording method according to claim 8, wherein the information transmission sheet is a sheet of plain paper or a sheet having an ink-receiving layer comprising a porous white inorganic substance.

10. A colored substance colored by the ink jet recording method according to claim 7.

11. An ink jet printer comprising a container comprising the ink composition according to claim 1.

* * * * *